US012333363B2

(12) United States Patent
Diaz et al.

(10) Patent No.: US 12,333,363 B2
(45) Date of Patent: Jun. 17, 2025

(54) METHOD AND APPARATUS FOR CONTROLLING CIRCUITRY WITH PARTICULAR APPLICATION TO SMARTCARDS

(71) Applicant: Drayson Technologies (Europe) Limited, London (GB)

(72) Inventors: Victor Diaz, London (GB); Vitor Freitas, London (GB); Alison Lloyd, London (GB)

(73) Assignee: Drayson Technologies (Europe) Limited, London (GB)

( * ) Notice: Subject to any disclaimer, the term of this patent is extended or adjusted under 35 U.S.C. 154(b) by 113 days.

(21) Appl. No.: 18/034,514

(22) PCT Filed: Nov. 1, 2021

(86) PCT No.: PCT/GB2021/052824
§ 371 (c)(1),
(2) Date: Apr. 28, 2023

(87) PCT Pub. No.: WO2022/090740
PCT Pub. Date: May 5, 2022

(65) Prior Publication Data
US 2023/0401412 A1   Dec. 14, 2023

(30) Foreign Application Priority Data
Oct. 30, 2020  (GB) .................................... 2017273

(51) Int. Cl.
*G06K 19/07* (2006.01)
*G06K 19/073* (2006.01)

(52) U.S. Cl.
CPC ..... *G06K 19/0715* (2013.01); *G06K 19/0723* (2013.01); *G06K 19/07354* (2013.01)

(58) Field of Classification Search
CPC ........... G06K 19/0715; G06K 19/0723; G06K 19/07354
(Continued)

(56) References Cited

U.S. PATENT DOCUMENTS 6,134,130 A * 10/2000 Connell .................. H02J 50/12
363/70
8,559,890 B2 * 10/2013 Merlin ..................... H04B 5/79
455/73

(Continued)

FOREIGN PATENT DOCUMENTS

CN   110610220 A   12/2019
EP   3594856 A1   1/2020

(Continued)

OTHER PUBLICATIONS

GB Combined Search and Examination Report under Sections 17 and 18(3) dated Sep. 24, 2021 in GB2017273.0.
GB Examination Report dated Mar. 27, 2023 in GB2017273.0.
PCT/GB2021/052824 International Search Report and Written Opinion dated Mar. 1, 2022.

*Primary Examiner* — Michael G Lee
*Assistant Examiner* — David Tardif
(74) *Attorney, Agent, or Firm* — Woodard, Emhardt, Henry, Reeves and Wagner LLP

(57) ABSTRACT

A smartcard circuit for control of a near field RF communications chip (500) of a smartcard (2000) is described. The circuit comprises a primary inductive coupler (1003) for connection to a near field antenna (2002) of a smart card for obtaining an RF electrical signal from the antenna, and a secondary inductive coupler (1005) arranged for inductive coupling with the primary inductive coupler and connected to the chip for provision of the RF electrical signal from the primary inductive coupler to enable the chip to perform near field RF communications for the smartcard. The disclosure also provides switching circuitry (528) coupled to the sec- (Continued)

ondary inductive coupler and comprising an RF conduction path selectively operable to disable said provision of the RF electrical signal thereby to inhibit the chip from performing near field RF communications. Advantageously the RF conduction path generally is controlled by a transistor (110) having a drain connected to one plate of at least one capacitor in the RF conduction path wherein a one-way conduction path is arranged so that transmission of RF signal along the RF conduction path causes accumulation of an electrical charge on the one plate of the at least one capacitor via the one-way conduction path.

20 Claims, 3 Drawing Sheets

(58) Field of Classification Search
    USPC .......................................................... 235/492
    See application file for complete search history.

(56) References Cited

U.S. PATENT DOCUMENTS

| 11,038,553 B2* | 6/2021 | Ding | H04B 5/72 |
| 2010/0103055 A1* | 4/2010 | Waku | H01Q 7/005 |
| | | | 343/702 |
| 2013/0115876 A1* | 5/2013 | McFarthing | H01Q 1/2216 |
| | | | 455/41.1 |
| 2017/0179765 A1* | 6/2017 | Habraken | H04B 5/70 |
| 2018/0034507 A1* | 2/2018 | Wobak | H04B 5/79 |

FOREIGN PATENT DOCUMENTS

| GB | 2575685 | 1/2020 |
| WO | WO 2007/042995 | 4/2007 |
| WO | WO 2020/016615 A1 | 1/2020 |
| WO | WO 2020/155483 A1 | 6/2020 |

* cited by examiner

METHOD AND APPARATUS FOR CONTROLLING CIRCUITRY WITH PARTICULAR APPLICATION TO SMARTCARDS

FIELD OF INVENTION

The present invention relates to smart cards and to circuitry for use in smartcards and to methods of operation of such circuitry and such smartcards.

BACKGROUND

Smartcards, also known as chip cards, or integrated circuit cards (ICC), are increasingly prevalent. A wide variety of such pocket-sized cards with embedded integrated circuits are in use in a wide variety of applications. The most frequent uses of such cards relate to financial transactions, mass transit systems, and access control. Smart cards are made of plastic, generally polyvinyl chloride, but sometimes polyethylene-terephthalate-based polyesters, acrylonitrile butadiene styrene or polycarbonate. Reusable smart cards may also be made from paper. Such cards often incorporate an integrated circuit, IC, and some source of power such as a near field RF communications interface for powering the IC and providing data communications to and from it.

An IC device, herein called a chip, traditionally consists of a single semiconductor die which has a particular function and which is adapted to interact with other chips and components. For example, a traditional chip might be a microprocessor, a memory controller, or a memory array. IC systems may include two or more chips, as well as other electronic and electrical components, each attached to and interconnected through a mounting system such as a printed circuit board.

The ability of near field RF communications devices to be passively powered is a significant benefit. Some near field communicator chips also provide auxiliary power outputs. This can enable power harvested by the near field RF communicator to be used by other circuits.

Biometric enabled smartcards are based on providing a service depending on the validity of biometric data, such as a fingerprint. A common application is to selectively allow/deny access to the data stored on a near field RF communicator (sometimes called a "tag") embedded in the smartcard dependent on validation/authentication of the biometric data. In order to make this system work, the tag must be hidden from the outside world until the fingerprint has been authenticated.

Switching to allow or deny access to the tag requires RF switching. A normal DC switch doesn't suffice. On top of that, due to smartcard manufacturing limitations, the RF switch included has to be under 350 um high. Other than so called diebond options, no commercially available RF switches meet this constraint, however diebond manufacturing increases costs. So the known solution for use in a smart cards is to injecting noise into the communications system to block or "jam" communications until biometric authentication is complete but these systems are expensive and may be insufficiently robust and secure.

Those RF switches which may be available cannot meet the specifications needed for the problems addressed by the present disclosure and in particular the cost, power rating, frequency of operation, and maximum height required for smartcard circuitry.

SUMMARY

Aspects and examples of the present invention are set out in the appended claims. Some may aim to provide secure and robust control of a near field RF communications chip in a smart card based on control by an auxiliary circuit, such as a biometric sensor and/or biometric authentication circuit. Other aspects and examples of the present invention aim to provide improved RF switches for use in these and other implementations.

Embodiments may provide an RF switching apparatus for use in smartcards. More specifically, the RF switching apparatus may comprise novel transistor level designs.

In an aspect there is provided a smartcard circuit for control of a near field RF communications chip for a smartcard, the circuit comprising:

a primary inductive coupler for connection to a near field antenna of a smart card for obtaining an RF electrical signal from the antenna;

a secondary inductive coupler arranged for inductive coupling with the primary inductive coupler and connected to the chip for provision of the RF electrical signal from the primary inductive coupler to enable the chip to perform near field RF communications for the smartcard; and switching circuitry coupled to the secondary inductive coupler and comprising an RF conduction path selectively operable to disable said provision of the RF electrical signal thereby to inhibit the chip from performing near field RF communications wherein the RF conduction path is controlled by a transistor having a drain connected to one plate of at least one capacitor in the RF conduction path wherein a one-way conduction path is arranged so that transmission of RF signal along the RF conduction path causes accumulation of an electrical charge on the one plate of at the least one capacitor via the one-way conduction path.

The switching circuitry may have a first state in which the RF electrical signal is provided to the near field RF communications chip and a second state in which the RF electrical signal is diverted away from the near field RF communications chip to inhibit the chip from performing near field RF communications.

The smartcard circuit may comprise an auxiliary rectifier, separate from the near field RF communications chip, for providing power to an auxiliary circuit of the smart card and comprising the primary inductive coupler.

In an aspect there is provided a smartcard circuit for control of a near field RF communications chip for a smartcard, the circuit comprising:

a splitter for connection to a near field antenna of a smart card for obtaining an RF electrical signal from the antenna and for splitting the RF electrical signal between an auxiliary circuit and the near field RF communications chip to enable the chip to perform near field RF communications for the smartcard; and switching circuitry coupled to the splitter and comprising a switchable element having a first state in which the RF electrical signal is provided from the splitter to the near field RF communications chip and a second state in which the RF electrical signal is diverted away from the near field RF communications chip to inhibit the chip from performing near field RF communications wherein the switchable element comprises an RF conduction path controlled by a transistor having a drain connected to one plate of at least one capacitor in the RF conduction path wherein a one-way conduction path is arranged so that transmission of RF signal along the RF conduction path causes accumulation of an electrical charge on the one plate of at the least one capacitor via the one-way conduction path.

The smart card circuit may be configured so that, in the first state, the RF electrical signal flows to the chip via a conductive link separate from the switchable element, and in the second state the RF electrical signal is diverted through the switchable element.

The switching circuitry may be connected between RF connections of the near field RF communications chip.

In an aspect there is provided a smartcard circuit for control of a near field RF communications chip for a smartcard, the circuit comprising:
- a primary inductive coupler for connection to a near field antenna of a smart card for obtaining an RF electrical signal from the antenna;
- a secondary inductive coupler arranged for inductive coupling with the primary inductive coupler and connected to the chip for provision of the RF electrical signal from the primary inductive coupler to enable the chip to perform near field RF communications for the smartcard; and
- switching circuitry coupled to the secondary inductive coupler and being selectively operable to disable said provision of the RF electrical signal thereby to inhibit the chip from performing near field RF communications.

In an aspect there is also provided a smartcard circuit for control of a near field RF communications chip for a smartcard, the circuit comprising:
- an antenna for near field inductive coupling with an H-field provided by another near field RF communications device in near field range, and arranged for providing, based on said inductive coupling, an RF electrical signal to circuits of the smart card;
- a secondary inductive coupler, carried on the smartcard, and arranged to obtain the RF electrical signal from the antenna by inductive coupling between the antenna and the secondary inductive coupler, wherein the secondary inductive coupler is electrically connected to the chip for provision of the RF electrical signal to the chip to enable the chip to perform near field RF communications for the smartcard; and
- switching circuitry coupled to the secondary inductive coupler and being selectively operable to disable said provision of the RF electrical signal thereby to inhibit the chip from performing near field RF communications.

The switching circuitry may comprise a tertiary inductive coupler arranged for inductive coupling with the antenna in preference to the secondary inductive coupler. For example, the tertiary inductive coupler, the antenna, and the secondary inductive coupler may be spatially arranged and/or electrically configured so that inductive coupling between the antenna and the tertiary inductive coupler is stronger than that between the antenna and the secondary inductive coupler. Any one of the RF switches described or claimed herein may be arranged to switch on and off the tertiary inductive coupler.

In these embodiments, switching on the tertiary inductive coupler may divert the RF electrical signal away from the near field RF communications chip (e.g. by dissipating it in a circuit connected to the tertiary inductive coupler) to inhibit the chip from performing near field RF communications.

The switching circuitry may comprise a switchable element having a first state in which the RF electrical signal is provided to the near field RF communications chip and a second state in which the RF electrical signal is diverted away from the near field RF communications chip to inhibit the chip from performing near field RF communications.

The smartcard circuit may comprise an auxiliary rectifier, separate from the near field RF communications chip, for providing power to an auxiliary circuit of the smartcard. The auxiliary rectifier may comprise the primary inductive coupler, which may be arranged to perform the function of a splitter by virtue of an inductive coupling with the secondary inductive coupler. For example, the inductive coupling between the two inductive couplers may provide a first part of the RF electrical signal to the chip and a second part of the RF electrical signal for powering the auxiliary circuits, e.g. via the auxiliary rectifier. Other approaches to splitting the incoming power may also be used.

In an aspect there is provided a smartcard circuit for control of a near field RF communications chip for a smartcard, the circuit comprising:
- a splitter for connection to a near field antenna of a smart card for obtaining an RF electrical signal from the antenna and for splitting the RF electrical signal between an auxiliary circuit and the near field RF communications chip to enable the chip to perform near field RF communications for the smartcard; and
- switching circuitry coupled to the splitter and comprising a switchable element having a first state in which the RF electrical signal is provided from the splitter to the near field RF communications chip and a second state in which the RF electrical signal is diverted away from the near field RF communications chip to inhibit the chip from performing near field RF communications.

The splitter may comprise a network of impedances arranged to inhibit variations in the electrical load provided by the auxiliary circuit from affecting the load at the antenna. For example, the splitter may reduce variations in the apparent input impedance of the smartcard circuit in the event of variations in the current drawn by the auxiliary circuit.

In an embodiment, in the first state the RF electrical signal flows to the chip via a conductive link separate from the switchable element, and in the second state the RF electrical signal is diverted through the switchable element.

The switching circuitry may be connected between RF connections of the near field RF communications chip.

The switching circuitry may provide a selectively operable connection in series with an RF connection of the near field RF communications chip. This connection may be closed to permit communication by the chip and opened to disconnect that RF terminal of the chip, thereby to inhibit (e.g. disrupt or prevent) communications by the chip.

The switching element may be connected between:
- a first impedance matching network for connecting the switching element to the near field RF communications chip; and
- a second impedance matching network which connects the switching element for receiving the RF electrical signal.

The splitter may comprise:
- a primary inductive coupler for connection to the near field antenna for obtaining the RF electrical signal from the antenna; and
- a secondary inductive coupler arranged for inductive coupling with the primary inductive coupler and connected to the chip for provision of the RF electrical signal from the primary inductive coupler to enable the chip to perform near field RF communications for the smartcard.

The switching circuitry may comprise a tertiary inductive coupler arranged for inductive coupling with the primary inductive coupler in preference to the secondary inductive coupler. For example, the tertiary inductive coupler, the primary inductive coupler, and the secondary inductive coupler may be spatially arranged and/or electrically configured so that inductive coupling between the primary inductive coupler and the tertiary inductive coupler is stronger than that between the primary inductive coupler and the secondary inductive coupler.

In these embodiments, switching on the tertiary inductive coupler may divert the RF electrical signal away from the near field RF communications chip (e.g. by dissipating it in a circuit connected to the tertiary inductive coupler) to inhibit the chip from performing near field RF communications.

The switching circuitry may comprise a first main connection and a second main connection connected by an RF conduction path, wherein the RF conduction path is connected to a reference voltage connection by a switchable conduction path.

The switchable conduction path may be connected in RF and isolated in DC, from the first main connection and the second main connection.

Said RF connection and DC isolation may be provided by decoupling capacitors connected between the switchable conduction path and respective ones of the first main connection and the second main connection.

A one way conduction path may be provided in parallel with the switchable conduction path and arranged so that, in operation, provision of an RF signal along the RF conduction path causes accumulation of an electrical charge on the RF conduction path via the one way conduction path.

The switchable conduction path may be provided by a conduction channel of a transistor and the one-way conduction path may be provided by a parasitic diode, such as a body diode. In some examples the transistor is a FET, such as a MOSFET for example an NMOSFET or a PMOSFET, and the parasitic diode comprises a body diode. It will be appreciated in the context of the present disclosure that the circuits shown in the drawings relate to NMOS implementations, but that by appropriate adjustments PMOS circuits may be used. For example, the reference voltages, which are indicated as "ground", in the drawings would correspond to a reference voltage appropriate for PMOS implementations. For example for a PMOS implementation of the circuit shown in FIG. 8 and FIG. 9 the reference voltage connection 110-14 may correspond to the VCC voltage (e.g. the positive supply voltage) of the controller 110-8. Similar changes would be applied in FIG. 10, in that reference voltage connection 110-14 may correspond to the VCC voltage (e.g. the positive supply voltage) of the controller 110-8 but also an additional resistor may be introduced between VCC and the connection to 110-10, 110-12 and 110-6.

Embodiments may comprise a band-stop filter connected to the switching circuitry. For example, a band-stop filter may be connected between the RF conduction path and a reference voltage connection such as a ground connection. The band-stop filter may be DC isolated from the reference voltage connection.

The switching elements and switchable elements described herein may also be referred to as an RF switch. Embodiments of the present disclosure provide radio frequency, RF, switches for use in the above described embodiments.

In an aspect there is provided a radio frequency, RF, switch for control of an electrical signal in a smartcard, the RF switch comprising:
  an RF conduction path for conducting RF electrical energy through the RF switch between a first main connection and a second main connection;
  a reference path connected to the RF conduction path wherein the reference path comprises:
    a switchable conduction path between the RF conduction path and a reference voltage connection; and
    a one way conduction path, in parallel with the switchable conduction path between the RF conduction path and the reference voltage connection;
  wherein the reference path is DC isolated from the first main connection and the second main connection so that, in operation, provision of an RF signal along the RF conduction path causes accumulation of an electrical charge on the RF conduction path via the one way conduction path.

The switchable conduction path may be RF connected to and DC isolated from the first main connection and the second main connection by a first decoupling capacitor connected between the switchable conduction path and the first main connection and a second decoupling capacitor connected between the switchable conduction path and the second main connection.

The switchable conduction path may be provided by a conduction channel of a transistor and the one-way conduction path is provided by a parasitic diode. The transistor may be a FET, such as a MOSFET, and the parasitic diode may comprise a body diode.

The RF switch may comprise a band-stop filter coupled between the RF conduction path and the reference voltage connection. The band-stop filter may be one of (a) connected between the reference path and the reference connection; and (b) connected between the RF conduction path and the reference connection.

A component may be connected between the reference path and the RF conduction path. Such a component may comprise at least one of (a) a chip; (b) a communication inhibiting circuit; and (c) a capacitor to provide said DC isolation of the reference path from the first main connection and the second main connection.

In an aspect of the disclosure there is provided a method of operating a smartcard, the method comprising:
  receiving, via an antenna of the smart card, an RF electrical signal for performing near field RF communications between a near field RF communications chip carried by the smartcard and a near field RF communications device in near field range;
  operating a splitter circuit of the smartcard to divide the RF electrical signal into (a) a first part provided to the near field RF communications chip and (b) a second part provided to an auxiliary circuit carried by the smartcard and separate from the chip;
  operating a switching circuit of the smart card to divert the first part of the RF electrical signal away from the near field RF communications chip to inhibit the near field RF communications chip from performing near field RF communications; and
  operating selectively, based on a signal provided from the auxiliary circuit, the switching circuit to provide the first part of RF electrical signal to the near field RF communications chip.

Diverting the first part of the RF electrical signal away from the near field RF communications chip may comprise one of: (a) connecting the RF electrical signal to a reference voltage such as ground; (b) providing a short circuit path between RF terminals of the chip; (c) operating a tertiary indictive coupler to inhibit inductive coupling between the first part of the RF electrical signal and the chip; and (d) providing a break or open circuit in an electrical conduction path of the RF electrical signal to the chip.

An aspect provides a radio frequency, RF, switch for control of an electrical signal in a smartcard, the RF switch comprising:
  an RF conduction path for conducting RF electrical energy through the RF switch between a first main connection and a second main connection wherein the RF conduction path comprises:
    a field effect transistor, FET, in which the conduction channel of the FET provides a switchable element of the RF conduction path, and
    a gate-source capacitor is connected between a gate connection and a source connection of the FET wherein the gate-source capacitor has a capacitance selected to provide a gate-source short-circuit at an operating frequency of the switch thereby enabling a DC control voltage applied to the gate to operate the FET independent of the amplitude of signals on the RF conduction path at the operating frequency.

The RF switch may comprise:
a decoupling capacitor which connects a drain of the FET to the first main connection wherein a body diode of the FET is connected to provide a one way conduction path in parallel with the conduction channel of the FET; and
a ground path connected to a reference voltage and connected by the one way conduction path and the conduction channel of the FET to the decoupling capacitor. A gate of the FET may be connected by a resistor to receive a control voltage from a controller. The controller may be connected to the reference voltage (e.g. the control voltage may be referenced to the same ground as the Rf switch). The ground path may comprise a further resistor, connected in series between a connection to the reference voltage and the conduction channel of the FET, for example this resistor may be connected to the source of the FET.

An aspect provides a single pole multi-throw switch comprising a plurality of RF switches according to any one or more of the RF switches described herein, wherein the first main connections of each of the plurality of RF switches are mutually connected together.

An embodiment provides an impedance matching circuit for a near field RF communications enabled smartcard comprising said single pole multi-throw switch and a controller arranged to select between a plurality of impedance matching configurations by operating said single pole multi throw switch.

Embodiments of the disclosure provide smartcard circuits comprising any of the RF switches described herein. In such smartcard circuits the RF switch may be arranged to be controlled by an auxiliary circuit of the card which operates the RF switch selectively to enable or to inhibit near field RF communication of a chip carried by the card based on a function performed by the auxiliary circuit, for example wherein the auxiliary function comprises a biometric authentication.

An aspect provides a smart card comprising an antenna, a near field RF communications chip and an auxiliary circuit, separate from the chip, and an RF switch such as any described or claimed herein wherein the RF switch is operable selectively to connect the communications chip to the antenna and is arranged to be controlled by the auxiliary circuit so that the auxiliary circuit can selectively enable and disable the chip by operating the switch. For example the auxiliary circuit may enable or disable the chip based on authenticating biometric data.

Embodiments of the disclosure aim to provide smart card circuit topologies which enhance the usefulness of the RF switching apparatus disclosed herein. For example, RF switches are usually designed for a specific range of power. Our initial research has shown that the key parameter that limits the performance of the switch is the voltage to which the switch is exposed. It is known that: Power=Voltage*Current. Similarly, it is also known that: Impedance=Voltage/Current. Naturally, in an RF circuit these parameters are complex, i.e. having both magnitude and phase, which must both be taken into account.

A variety of splitters are described herein, but it will be appreciated in the context of the present disclosure that whilst these types of splitters have particular advantages, other types of splitting circuits may be used.

Some splitters described herein may comprise a first port connected to the antenna coupling and having a first input impedance; a second port connected to the first port and configured to provide a first part of the alternating electrical signal to the chip via the switching circuit; and a third port connected to the first port and configured to provide a second part of the alternating electrical signal to auxiliary circuit. Such splitters may be configured to maintain the first input impedance so that: the output impedance of the second port is maintained in the event of fluctuations in the output impedance of the third port; and the output impedance of the third port is maintained in the event of fluctuations in the output impedance of the second port, the splitter may be configured to provide, at the first port, variations in electrical load corresponding to the variations in electrical load at the second port thereby to enable the chip to perform near field RF communications via load modulation.

BRIEF DESCRIPTION OF DRAWINGS

Embodiments of the disclosure will now be described in detail with reference to the accompanying drawings, in which.

In the drawings like reference numerals are used to indicate like elements.

SPECIFIC DESCRIPTION

Figure 1:
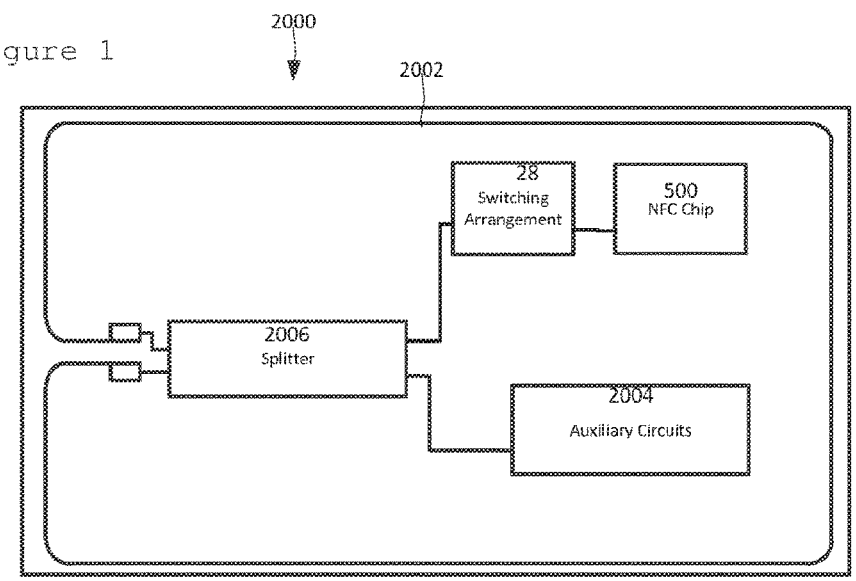
FIG. 1 shows a smart card apparatus comprising a splitter and a near field RF communicator.

FIG. 1 shows a functional block diagram of a smartcard 2000. The smartcard 2000 comprises a near field antenna 2002, a near field RF communications chip 500, auxiliary circuits 2004 separate from the chip 500, and circuitry for controlling the chip. The circuitry for controlling the chip comprises a splitter 2006 and a switching arrangement 28.

Figure 2:
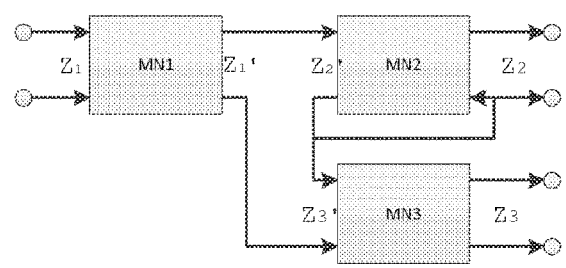
FIG. 2 shows a diagram of a splitter for use in an apparatus such as that illustrated in FIG. 1.
Figure 3:
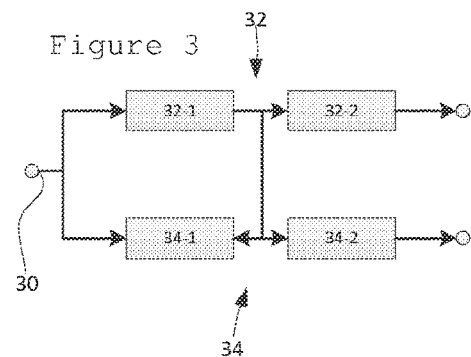
FIG. 3 shows a diagram of another splitter for use in an apparatus such as that illustrated in FIG. 1.
Figure 4:
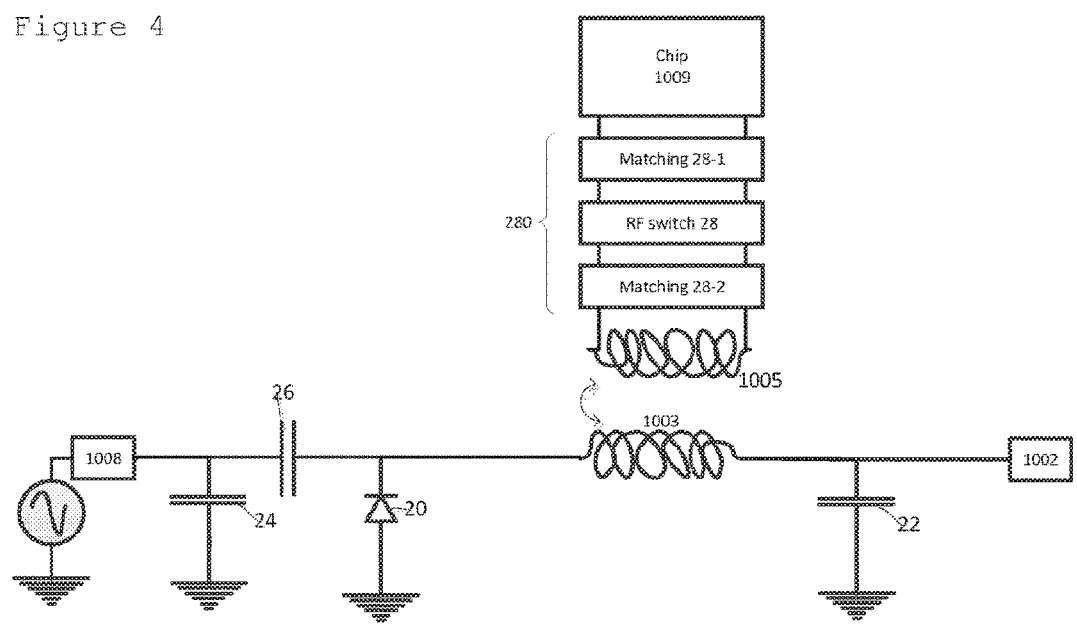
FIG. 4 shows a further smart card apparatus comprising a splitter and a near field RF communicator in which the splitter is provided by inductive coupling.

The splitter 2006 is connected to the antenna, and to the auxiliary circuits 2004. It is also connected to the chip via a switching arrangement. The splitter 2006 has an input for connection to the antenna, and may be configured to provide an input impedance which matches the output impedance of the antenna 2002. The splitter 2006 also has a first output for connection to the NFC chip 500 via the switching arrangement, and a second output for connection to the auxiliary circuit. The splitter 2006 may comprise electrical components arranged so that the first output impedance matches the input impedance of the connection to the NFC chip via the switching arrangement. It may also comprise electrical components arranged so that the second output impedance matches the input impedance of the auxiliary circuit. The splitter 2006 may be arranged so that variations in load from the auxiliary circuit do not modify the input impedance provided by the splitter. Examples of appropriate splitter circuits are illustrated in FIG. 2, FIG. 3, and FIG. 4, but other splitters may be used.

The switching circuitry 28 is coupled to the splitter and comprises a switchable element (which is not shown in FIG. 1). The switchable element is selectively operable to provide:
 a first state of the switching circuit in which an RF electrical signal provided from the splitter is provided to the near field RF communications chip; and
 a second state in which the RF electrical signal is diverted away from the near field RF communications chip.

In operation, when a near field RF signal is received by the antenna 2002 of the smart card from a near field RF communications device in near field range, an RF electrical signal is induced in the antenna and provided from the antenna to the splitter circuit.

The splitter 2006 circuit of the smartcard divides the RF electrical signal into (a) a first part which is to be provided to the near field RF communications chip via the switching arrangement and (b) a second part which is to be provided to the auxiliary circuit.

The switching circuit 28 is first operated in its first state to divert the first part of the RF electrical signal away from the near field RF communications chip to inhibit the near field RF communications chip from performing near field RF communications.

The auxiliary circuit then uses the second part of the RF electrical signal to perform some auxiliary function, such as biometric authentication and/or biometric sensing. Based on this auxiliary function it is determined whether to permit operation of the chip.

In the event that the chip is to be allowed to communicate, the switching circuit is switched into its second state to provide the first part of RF electrical signal to the near field RF communications chip.

It can thus be seen that operation of the switching circuit can inhibit the chip from performing near field RF communications e.g. until a function of the auxiliary circuit has been completed and an authentication/control process has indicated that the chip should operate.

As noted above, a variety of different splitting circuits may be used. A first example of a splitter is illustrated in FIG. 2, and a second in FIG. 3. Yet a third example is provided in FIG. 4, albeit in somewhat different topology. It will be appreciated from this disclosure however that a variety of different splitting circuits may be used and the principles of the present disclosure are not limited to one specific splitting topology. Typically however in the most advantageous systems the splitter is arranged to inhibit variations in the electrical load provided by the auxiliary circuit from affecting the load at the antenna. In other words, the splitter is arranged so that variations in the load associated with the auxiliary circuit are decoupled from the electrical load (impedance) presented at the smartcard antenna. This may be achieved by a network of impedances, such as a network of lumped components configured to provide such functionality.

FIG. 2 illustrates one such example which comprises a matching network having three stages, a first stage is provided by an antenna matching network, MN1, a second stage by a rectifier matching network, MN2, and a third stage by a communications chip matching network, MN3.

The antenna matching network MN1 has an input port comprising two input connections, and an output comprising two output connections. Likewise, the chip matching network and the rectifier matching network each have an input port comprising two input connections, and an output port comprising two output connections.

The two input connections of the antenna matching network can be connected to an antenna, which can provide an alternating electrical signal to the splitter. The first output connection of the antenna matching network, MN1, is connected to the first input connection of the rectifier matching network, MN2, whereas the second output connection of the antenna matching network, MN2, is connected to the second input connection of the chip matching network, MN3. The second input connection of the rectifier matching network, MN2 is connected to the first input connection of the chip matching network, MN3, and to the second output connection of the rectifier matching network, MN2.

The antenna matching network MN1 comprises a network of passive components, having some impedance such as a reactive impedance, such as capacitance and/or inductance. The antenna matching network may be arranged to provide an input impedance, Z1, which matches the output impedance of a near field RF communications antenna. It may have an output impedance Z1'. Likewise, the chip matching network and rectifier matching network may also each comprise a network of such passive components. The input impedance of the chip matching network may be Z2', and its output impedance Z2. The input impedance of the rectifier matching network may be Z3', and its output impedance Z3. In an embodiment, the impedance Z1 may be consist essentially of an impedance with a positive imaginary part, while Z2 and Z3 may each consist essentially of complex impedance with either a positive or a negative imaginary part. The impedance Z1' may be equal to the conjugate of the sum of the impedances Z2' and Z3'. The ratio of the real part of Z2' to Z3' may define the ratio of the split of input power from the antenna to the output connections of the chip matching network and the rectifier matching network.

FIG. 3 shows a functional block diagram of another example of a splitter for use in the apparatus of FIG. 1. The splitter shown in FIG. 3 has an input leg 30 for connection to the antenna. The input leg 30 is connected by a bifurcated electrical conduction path to two output arms 32, 34. The first output arm 32 comprises an input stage 32-1 and an output stage 32-2, which are connected together in series. Likewise, the second output arm 34 also comprises an input stage 34-1 and an output stage 34-2.

The input stage 32-1 of the first arm 32 is connected between the input leg 30 and the output stage 32-2 of the first arm 22. The input stage 34-1 of the second arm 34 is connected between the input leg 30 and the output stage 34-2 of the second arm 34. The connection between the input stage and the output stage of the first arm 32 may be connected, e.g. by a resistor (not shown) or other pure real impedance, to the connection between the input stage 34-1 and the output stage 34-2 of the second arm 34.

The input stages and output stages of the two arms 32, 34 may each comprise networks of passive, e.g. reactive, components such as inductors and capacitors arranged to provide a phase shift to the input signal. These may be lumped components. The phase shift provided by the input stage 32-1, 34-1 of each arm 32, 34 may be equal to that provided by the input stage of the other arm 34, 32. Also, the phase shift provided by the output stage of each arm may be equal to that provided by the output stage of the other arm. These stages may be arranged as either high pass filters, or low pass filters. Significantly, the use of such structures may reduce changes in the output impedance of one arm due to changes in the load/impedance presented at the output of the other arm. By selecting the impedance of these different stages appropriately, the power of the alternating electrical signal received from the input leg may be divided between the two arms according to a selected ratio, R.

The division of power between the first arm and the second arm may be controlled by selecting the ratio of the impedance of the input stage of the each arm relative to the output stage of that arm, and by selecting the ratio of the impedance of the input stage of the first arm to the impedance of input stage of the second arm. For example, a ratio of power division, R, may be provided between a 'main branch' arm which takes more of the power from the input leg than a 'secondary branch' arm. To achieve this, the magnitude of the impedance of the input stage of the 'main branch' arm may be 1/R of the impedance of the input stage of the 'secondary branch' arm. The 'main branch' arm output stage may have an impedance equal to the 'main branch' arm input stage divided by the square root of (1+R). The 'secondary branch' output stage may have an impedance equal to the 'main branch' arm input stage divided by the square root of (R*(1+R)). The splitter 902 shown in FIG. 3 is illustrated as being single ended, but it will be appreciated in the context of the present disclosure that differential embodiments may also be provided.

FIG. 4 shows a circuit for control of a near field RF communications chip for a smartcard.

The circuit comprises an input connection 1008 for connecting to a near field antenna of the smart card for coupling inductively with a radio frequency, RF, H-field to provide an RF electrical signal in the smartcard.

The circuit also comprises a rectifier 20, 22, 24, 26, 1003. The rectifier 20, 22, 24, 26, 1003 comprises a first input capacitor 26, a second input capacitor 24, and a rectifying element 20. The first input capacitor 26 is connected in series with the input connection 1008. The second input capacitor is connected between a reference voltage connection and the input connection 1008. The rectifying element 20 is connected in a shunt configuration to the input connection 1008 via the input capacitor 26 to provide a one-way conduction path between the first input connection 1008 (via the first input capacitor 26) and the reference voltage connection, such as a ground e.g. a virtual ground. The series connection of the rectifying element 20 and the first capacitor 26 are thus connected in parallel with the second input capacitor 24. The rectifier also comprises a primary inductor 1003 connected, at one end, to the connection between the rectifying element 20 and the first input capacitor 26 and, at the other end, to an output of the rectifier 1002.

To split the RF electrical signal the circuitry of FIG. 4 also comprises a secondary inductor 1005, arranged for inductive coupling with the primary inductor 1003. The secondary inductor is coupled via a switching arrangement 280 to the chip 1009. The switching arrangement 280 comprises an RF switch 28 and may comprise matching elements 28-1, 28-2 which connect the RF switch 28 to the secondary inductor 1005 and to the chip 1009. As illustrated, matching element 28-1 connects the RF switch 28 to the chip 1009 and matching element 28-2 connects the RF switch 28 to the secondary inductor 1005.

The primary inductor 1003 and secondary inductor 1005 are mutually spatially arranged so that when the RF electrical signal flows in the primary inductor 1003 it induces a second alternating RF signal in the secondary inductor 1005. The inductive coupling between the two inductors 1003, 1005, provides an RF conduction path between the chip and the smartcard antenna thereby to enable the chip to perform near field RF communications via the smart card's antenna. The primary inductor 1003 and the secondary inductor 1005 may comprise laminar structures, for example tracks of conductive material carried on the substrate, such as printed coil inductors.

The switching arrangement 28 is coupled to the secondary inductor and is selectively operable to disable said provision of the RF electrical signal to the chip thereby to inhibit the chip from performing near field RF communications.

The output 1002 of the rectifier may be connected to power a voltage load such as the auxiliary circuit described above. The circuit of FIG. 4 may thus operate precisely as described above with reference to FIG. 1 other than in that the splitter is provided by the coupling between the primary inductor and the secondary inductor.

The switching arrangement 28 of the embodiments described above with reference to FIG. 1 and FIG. 4 may be implemented in a variety of topologies. These topologies will now be discussed with reference to the inductive coupling arrangement of FIG. 4. It will be appreciated however in the context of the present disclosure that these same topologies may be deployed in systems such as that illustrated in FIG. 1.

In a first topology, the RF switch 280 is coupled to provide a controllable short circuit between the RF terminals of the chip 1009. The RF switch 280 of FIG. 4 has a first main connection having two terminals (e.g. 110-10 in FIG. 7) each of which are coupled to a corresponding one the RF terminals of the chip 1009. The RF switch 280 also has a second main connection having two terminals (e.g. 110-12 in FIG. 7) each of which are coupled to a corresponding one of the two ends of the secondary inductor 1005.

Figure 7:
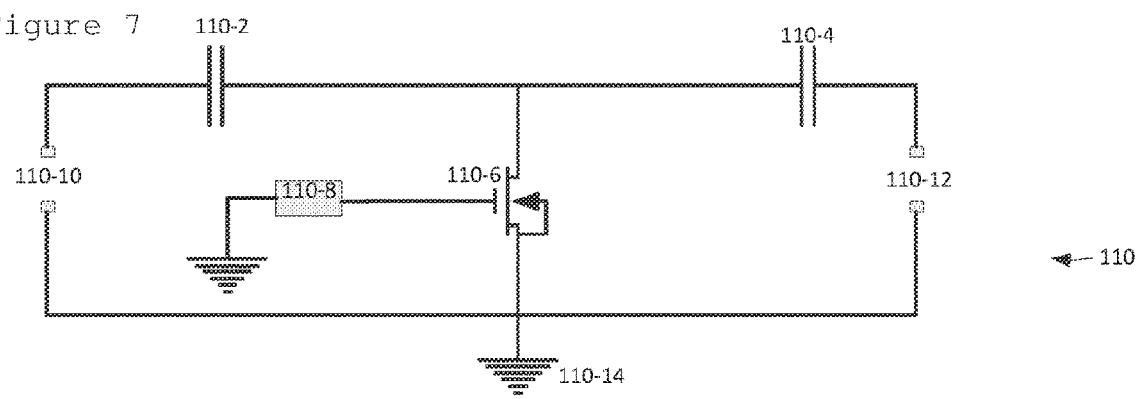
FIG. 7 is a diagram of a switching circuit for use in RF circuits and in apparatus such as that illustrated in any of FIG. 1, 4 or 5.
Figure 9:
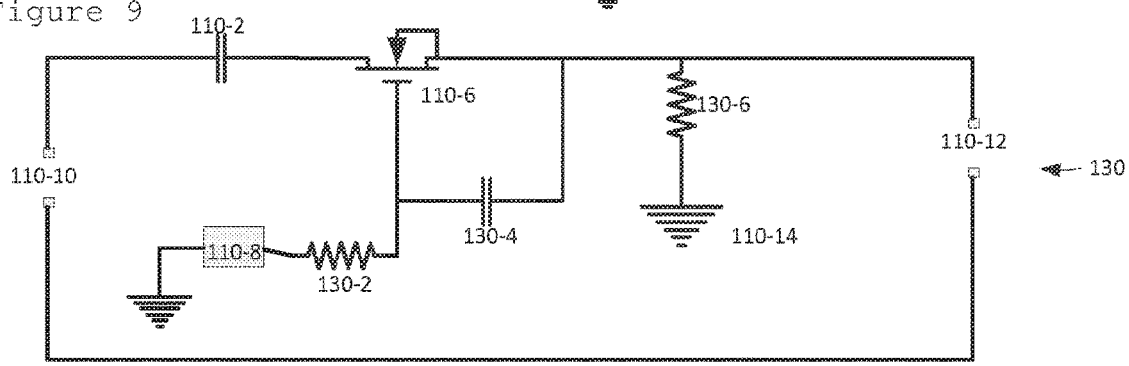
FIG. 9 is a diagram of a switching circuit for use in RF circuits and apparatus such as that illustrated in any of FIG. 1, 4 or 5.

The RF switch 280 is selectively controllable to switch between a first state in which an RF electrical signal provided to the first main connection of the switch 280 is conducted to the second main connection and a second state in which the second main connection is decoupled from an RF electrical signal provided to the first main connection. In operation the RF switch can be held in the second state to prevent an RF electrical signal from being provided to the terminals of the chip. For example, if the RF switch 110 of FIG. 7 is used, this may be done by switching on the FET 110-6 to provide a short circuit at RF frequencies between the terminals of the chip. As another example, if the RF switch 130 of FIG. 9 is used, this may be done by switching off the FET 110-6 to disconnect one of the terminals of the chip 1009.

In switching arrangements such as this, any of the RF switches illustrated in and described below with reference to FIG. 7, 8, 9 or 10 may be used.

Such switching arrangements need not completely short circuit the chip and/or the secondary inductor. For example they may be arranged to connect or to disconnect a resistor, a capacitor or other reactive impedance to inhibit provision of the RF electrical signal from the secondary inductor 1005 to the chip 1009. In this way, embodiments may provide selectively controllable impedance mismatching between the chip 1009 and the secondary inductor 1005 from the first inductor 1003. Likewise, embodiments may provide selectively controllable detuning of the secondary inductor 1005 from the primary inductor 1003.

Whether by detuning the inductors 1003, 1005 or by mismatching the chip and the secondary inductor 1005, this enables coupling between the splitter 1003, 1005 and the chip 1009 to be selectively degraded by operation of the switch so that the RF electrical signal from the splitter 1003, 1005 is lost or attenuated to prevent the chip from communicating. Thus, a controller, such as one provided in the auxiliary circuit can enable or disable operation of the chip 1009 by operation of the switch 280.

It can be seen in FIG. 4 that two matching networks 28-1, 28-2 may be provided. The first impedance matching network 28-2 may be connected between the RF switch 28 and the connection to a splitter. This may be any of the splitters described with reference to FIG. 1, FIG. 2, FIG. 3, or FIG. 4. The first impedance matching network 28-2 has two outputs, and the RF switch 28 is connected between these two outputs. The second impedance matching network 28-1 may connect the RF switch 28 to the splitter. The second impedance matching network 28-1 has two inputs which are each connected to a corresponding output of the splitter. The second impedance matching network 28-1 also has two outputs, each of which may be connected to a corresponding terminal of the chip 1009.

The first impedance matching network 28-2 may provide a step down in impedance from a high impedance presented to the splitter to a lower impedance presented to the RF switch 28. The second impedance matching network 28-1 may provide a step up in impedance from a low impedance presented to the RF switch 28 to a higher impedance presented to the chip 1009. This may enable the RF switch 28 to be protected from high voltages. In switching arrangements such as this, any of the RF switches illustrated in and described below with reference to FIG. 7, 8, 9 or 10 may be used.

A variety of implementations are possible using the principles of the present disclosure and in particular it may be possible to provide the RF electrical signal to the secondary inductor direct from the antenna, for example by positioning the secondary inductive coupler so that an RF electrical signal (e.g. a current) flowing in the antenna induces, by inductive coupling, a corresponding RF electrical signal in the secondary inductor. Thus, embodiments are provided in which the primary inductor is not necessary, or at least the inductor of any rectifier which is present for powering an auxiliary circuit is not used for inductive coupling to the chip.

Figure 5:
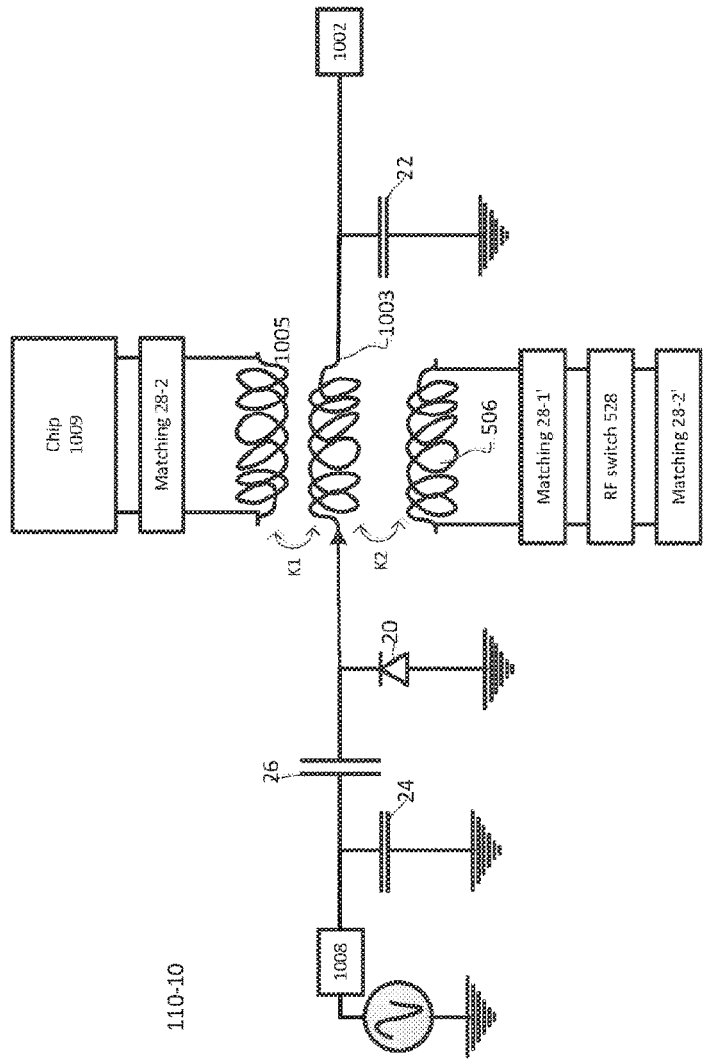
FIG. 5 shows a smart card apparatus such as that defined in FIG. 4.

FIG. 5 shows a further switching arrangement in which the connection between the chip 1009 and the near field antenna is as described above with reference to FIG. 4, but in which the secondary inductor 1005 is connected directly to the chip 1009 by a matching network 28-2, without any switching arrangement between the secondary inductor 1005 and the chip 1009. However, in addition, a tertiary inductor 506 is provided which is positioned for inductive coupling with the primary inductor 1005. To provide switching, an RF switch 528 is connected to the tertiary inductor 506 for switching it on and off. When the tertiary inductor 506 is switched on, the coupling between the primary inductor 1005 and the secondary inductor 1003 is attenuated to disrupt communications by the chip. For example, the coupling factor K2 between the tertiary inductor 506 and the primary inductor 1005 may be much greater than the coupling factor K1 between the secondary inductor and the primary inductor. It can be seen that the RF switch 528 may be connected to the tertiary inductor 506 by a matching network 28-1' connected to the first main connection (110-10; FIGS. 7 to 10 of the switch 528 and a matching network 28-2' may be connected to the second main connection (110-12; FIGS. 7 to 10) of the switch 528.

In operation, when the RF switch 528 is open, coupling between the primary inductor 1003 and the secondary inductor 1005 can be used for splitting the signal and to allow the chip 1009 to communicate via the antenna. When the switch 528 is operated to switch on the tertiary inductor 506, the higher coupling factor of the tertiary 506 prevents the coupling of power to the secondary coil 1005. A significant advantage of this solution is that the tertiary coil (and any capacitor used to tune it to the relevant operating frequency) can be designed so that RF switches 528 with low voltage ratings can be used.

In switching arrangements such as this, any of the RF switches illustrated in and described below with reference to FIGS. 7 to 10 may be used.

Figure 6:
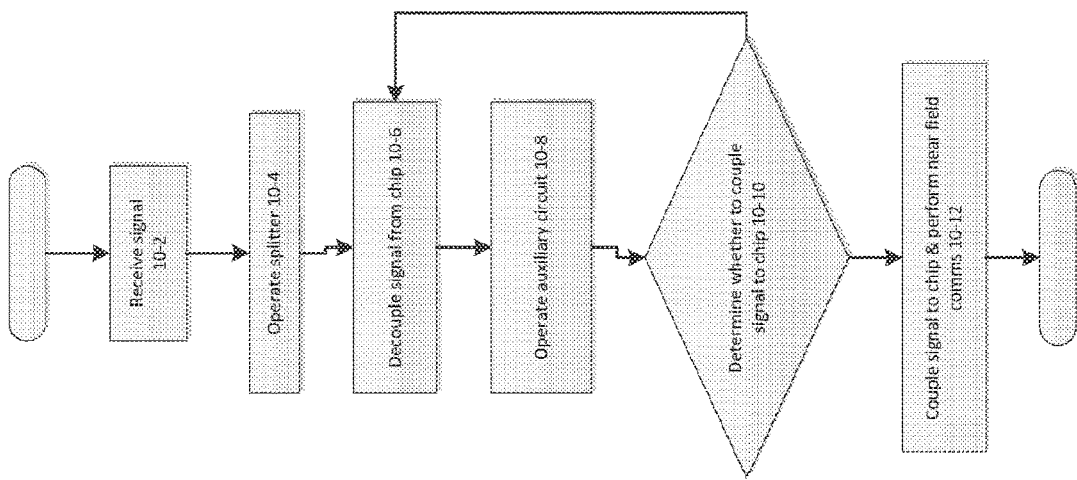
FIG. 6 is a flow chart illustrating a method of operating smartcard circuits such as those described herein.

FIG. 6 is a flowchart illustrating a method such as may be employed with any one or more of the switching arrangements described or claimed herein. In some modes of operation, the default status of the smartcard is that the switching arrangement inhibits operation of the chip (e.g. NFC chip is not "visible") until a security function such as authentication e.g. of some biometric data such as a fingerprint has been completed and is found valid.

Initially, an RF electrical signal is received 10-2, via an antenna of the smart card, for performing near field RF communications between a near field RF communications chip carried by the smartcard and a near field RF communications device in near field range.

A splitter circuit, such as any of those described herein is then operated 10-4 to divide the RF electrical signal into (a) a first part provided to the near field RF communications chip and (b) a second part provided to an auxiliary circuit carried by the smartcard and separate from the chip.

A switching circuit of the smartcard (such as any of those described with reference to FIGS. 1 to 5) is then operated 10-6 to divert the first part of the RF electrical signal away from the near field RF communications chip to inhibit the near field RF communications chip from performing near field RF communications.

The auxiliary circuit is then operated 10-8, for example to perform a security function such as authentication and/or sensing such as biometric sensing and/or authentication.

It is then determined 10-10, based on a signal provided from the auxiliary circuit in accordance with this security function, whether to provide the first part of RF electrical signal to the near field RF communications chip. In the event that it is determined that the chip should be operated, the switching circuit is operated to couple 10-12 the first part of the RF electrical signal to the chip for performing near filed communications. Otherwise the switch is operated to hold the chip decoupled 10-6 from the RF electrical signal thereby to inhibit communication.

RF switches suitable for use in the methods and topologies described above, and which may be useful in other smartcard applications and elsewhere will now be described with reference to FIGS. 7 to 10. In description of these RF switches, they are referred to as being "closed" when an RF signal provided at its first main connection is conducted to its second main connection, for example carried predominantly to its second main connection and vice versa. They are referred to as being "open" when an RF signal provided at its first main connection is not conducted to its second main connection, for example predominantly at its second main connection and vice versa.

FIG. 7 shows a first RF switch 110 comprising a first main connection 110-10, a second main connection 110-12, a first decoupling capacitor 110-2, a second decoupling capacitor 110-4, a FET 110-6, a controller 110-8 and a reference voltage connection 110-14 e.g. a connection to a ground or virtual ground. In summary, when the FET is in a non-conducting state the RF switch 110 is closed because the first main connection 110-10 is connected to the second main connection 110-14 at the operating RF frequency of a near field chip. When the FET is in a conducting state this RF switch is open because the first main connection and the second main connection are both connected to the reference voltage connection (e.g. to ground) at the operating RF frequency of a near field chip.

The first main connection 110-10 comprises two terminals a first terminal connected to a first plate of the first decoupling capacitor 110-2, and a second terminal connected to the reference voltage connection 110-14.

A second plate of the first decoupling capacitor 110-2 is connected to a first plate of a second decoupling capacitor 110-4 and to drain of the FET 110-6. The second plate of the second decoupling capacitor 110-4 is connected to a first terminal of the second main connection 110-12. A second terminal of the second main connection 110-12 is connected to the reference voltage connection 110-14.

The controller 110-8 is connected between the reference voltage connection and the gate of the FET. The source of the FET is connected to the reference voltage connection. The body diode of the FET provides a one way conduction path from the reference voltage connection to the connection between the two decoupling capacitors.

In operation, an RF electrical signal is provided across the terminals of the first main connection, and as a result current flows via the one-way conduction path provided by the body diode to charge up the capacitors 110-2, 110-4, (and so to increase the voltage at the drain of the FET) until the body diode is no longer biased sufficiently to conduct by the RF electrical signal.

Figure 8:
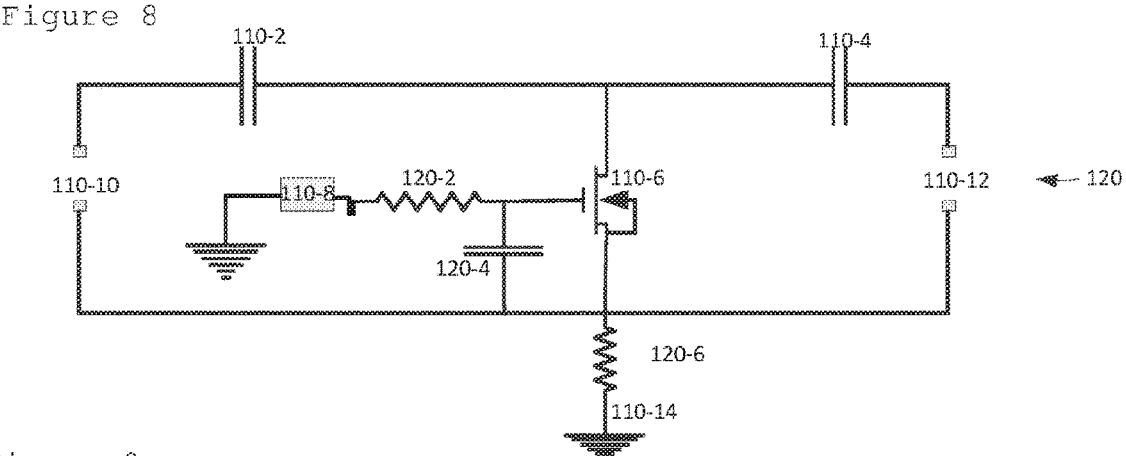
FIG. 8 is a diagram of a switching circuit for use in RF circuits and apparatus such as that illustrated in any of FIG. 1, 4 or 5.

FIG. 8 shows a second RF switch which is identical to the switch described above with reference to FIG. 7 other than in that the gate of the FET 110-6 is connected to the second terminal of the first main connection and the second terminal of the second main connection by a third decoupling capacitor 120-4 and the output of the controller 110-8 is connected to the gate of the FET 110-6 by a resistor 120-2. In addition, a resistor 120-6 is connected between the source of the FET and the reference voltage connection.

In this configuration, none of the pins of the switch need to be grounded. The resistors 120-2, 120-6 present a high impedance path for RF, but at the same time allow for the correct polarization of the gate of the FET 110-6. This is possible due to the fact that the DC resistance between gate and source is of the order of 10s of mega-ohms, which in series with the two resistors 120-2, 120-6 (typically about 50 kilo-ohms gets most of the control voltage. The third decoupling capacitor avoids operation of the FET by the RF signal.

In the event that the controller provides a sub-threshold voltage to the gate of the FET, the connection between the first decoupling capacitor and the second decoupling capacitor 110-2 and 110-4 is isolated in DC and held at a voltage sufficient to prevent the body diode from conducting. In addition, the decoupling capacitors 110-2 and 110-4 are configured to provide a short circuit between the first main connection and the second main connection at the operating RF frequency of a near field RF communications chip.

In the event that the controller provides a supra-threshold voltage to the gate of the FET, the FET conducts to provide a conduction path from (a) the reference voltage connection to (b) the connection between the two decoupling capacitors. Thus the FET provides a very low impedance conduction path so that power provided at the first main connection is not provided at the second main connection, and as a result the switch is held in an "open" state. For example, when the FET switches on suddenly the input impedance seen at 110-10 drops, so power transfer from a circuit connected at 110-10 which had previously been matched is suddenly mismatched. In addition, the output impedance at 110-12 also drops as current which would previously have been provided to the circuit (such as a chip) connected at 110-12 flows instead through the FET.

FIG. 9 shows a third RF switch 130 in which the transistor is arranged in series between the two main connections instead of being in shunt. The RF switch 130 comprised a first main connection 110-10, a second main connection 110-12, a first decoupling capacitor 110-2, a gate decoupling capacitor 130-4, a FET 110-6, a controller 110-8 and a reference voltage connection 110-14 e.g. a connection to a ground or virtual ground. In summary, when this RF switch 130 is closed the first main connection 110-10 is connected to the second main connection 110-14 at the operating RF frequency of a near field chip. When this RF switch is open the first main connection 110-10 is open circuit and the second main connection 110-12 is left unconnected.

The first main connection 110-10 comprises two terminals a first terminal connected to a first plate of the first decoupling capacitor 110-2, and a second terminal connected to a second terminal of the second main connection 110-12. The second plate of the first decoupling capacitor 110-2 is connected to the drain of the FET 110-6. The source of the FET 110-6 is connected to the first terminal of the second main connection 110-12, and is connected by the gate decoupling capacitor 130-4 to the gate of the FET 110-6. The body diode of the FET 110-6 provides a one way conduction path from the first terminal of the second main connection 110-12 to the second plate of the first decoupling capacitor 110-2.

The output of the controller 110-8 is connected to the gate of the FET 110-6 by a resistor 130-2. The source the FET 110-6 is connected to the reference voltage connection 110-14 by a further resistor 130-6.

In operation, when an RF electrical signal is provided across the terminals of the first main connection, the body diode conducts to charge up the capacitor 110-2 connected to the drain of the FET until the voltage of the RF electrical signal is insufficient to cause the body diode to conduct. When the controller 110-8 switches on the FET 110-6, the RF switch 130 is closed, and when it switches off the FET, the RF switch 130 is open.

The arrangement of the resistors 130-2 and 130-6 in FIG. 9 provide significant advantages for the desirable (e.g. proper) behaviour of the switch.

Figure 10:
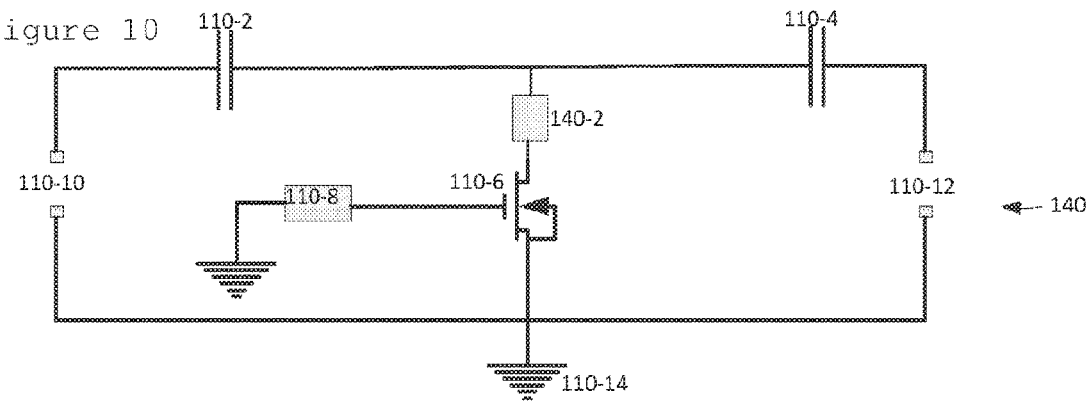
FIG. 10 is a diagram of a switching circuit for use in RF circuits and apparatus such as that illustrated in such as that illustrated in in any of FIG. 1, 4 or 5.

FIG. 10 illustrates a further RF switch which is identical to that illustrated in FIG. 7 other than in that a component 140-2 is connected in series with the drain of the FET 110-6 between the FET 140-2 and the two decoupling capacitors 110-2, 110-4. If this component comprises a capacitor, which DC isolates the drain of the FET (and optionally some or all of the component) from the main connections of the switch, the decoupling capacitors 110-2, 110-4 may be dispensed with. This switch may be configured in a variety of different ways. As a first example, the component may simply be a capacitor and the decoupling capacitors 110-2, 110-4 may be omitted. As a second example, the component may comprise a further communications control device or method, such as impedances selected to provide an impedance mismatch so that when the FET is closed, the component is powered by the RF signal to inhibit (for example interrupt or prevent) the communications. As a third example, the component may comprise the chip, so that when the FET is closed, the RF electrical signal can is provided to the chip.

It will be appreciated in the context of the present disclosure that in any of these RF switches, the FET may be provided by any number of FETs ganged together. For example they may be connected in series, with their body diodes arranged to conduct in the same direction and their gate terminals all connected together.

It will be appreciated in the context of the present disclosure that lumped components may comprise discrete capacitors and inductors, as distinct from distributed elements such as microstrips or transmission lines which provide spatially distributed capacitance and/or inductance along their length. One example of a lumped component, which may be of particular utility in the provision of flat, low-profile devices such as smart cards, is a printed coil inductor. Such an inductor may comprise a laminar conductive coil on one surface of a dielectric, which follows a spiral path in from an input connection at the outside of the spiral to a connection through the dielectric inside the spiral. On the other side of the dielectric, a second laminar conductive coil may follow a mirror image of the same path out from this connection to an output connection at the outward edge of the spiral. The output connection may also be connected back through the dielectric so that input and output to the inductor may be provided on the same surface of the dielectric. The dielectric may comprise a substrate upon which a circuit is printed in the manner of a PCB. Other types of printed coil inductors may be used.

The FET described herein may comprise an N-channel FET and this may have certain advantages. However P-channel FETs may also be used.

Smart cards, also known as chip cards, or integrated circuit cards (ICC), are increasingly prevalent. A wide variety of such pocket-sized cards with embedded integrated circuits are in use in a wide variety of applications. The most frequent uses of such cards relate to financial transactions, mass transit systems, and access control. Smart cards are made of plastic, generally polyvinyl chloride, but sometimes polyethylene-terephthalate-based polyesters, acrylonitrile butadiene styrene or polycarbonate. Reusable smart cards may also be made from paper. Such cards often incorporate an integrated circuit, IC, and some source of power such as a near field RF communications interface for powering the IC and providing data communications to and from it.

An IC device, herein called a chip, traditionally consists of a single semiconductor die which has a particular function and which is adapted to interact with other chips and components. For example, a traditional chip might be a microprocessor, a memory controller, or a memory array. IC systems may include two or more chips, as well as other electronic and electrical components, each attached to and interconnected through a mounting system such as a printed circuit board.

Near field RF (radio frequency) communication requires an antenna of one near field RF communicator to be present within the alternating magnetic field (H field) generated by the antenna of another near field RF communicator by transmission of an RF signal (for example a 13.56 MegaHertz signal) to enable the magnetic field (H field) of the RF signal to be inductively coupled between the communicators. The RF signal may be modulated to enable communication of control and/or other data. Ranges of up to several centimetres (generally a maximum of 1 metre) are common for near field RF communicators.

Near field communication in the context of this application may be referred to as near-field RF communication, near field RFID (Radio Frequency Identification) or near field communication. The range of such devices depends on the antenna used but may be, for example, up to 1 metre. The precise range may depend on transmit power, and modulation scheme.

Communication of data between NFC communicators may be via an active communication mode in which the NFC communicator transmits or generates an alternating magnetic field modulated with the data to be communicated and the receiving NFC communicator responds by transmitting or generating its own modulated magnetic field, or via a passive communication mode in which one NFC communicator transmits or generates an alternating magnetic field and maintains that field and the responding NFC communicator modulates the magnetic field to which it is inductively coupled with the data to be communicated, for example by modulating the load on the inductive coupling ("load modulation"). Near field RF communicators may be actively powered, that is have an internal or associated power source, or passively powered, that is derive a power supply from a received magnetic field. Generally an RF transceiver will be actively powered while an RF transponder may be passively or actively powered.

Examples of near field RF communicators are defined in various standards for example ISO/IEC 18092 and ISO/IEC 21481 for NFC communicators, and ISO/IEC 14443 and ISO/IEC 15693 for near field RF communicators.

Any feature of any one of the examples disclosed herein may be combined with any selected features of any of the other examples described herein. For example, features of methods may be implemented in suitably configured hardware, and the configuration of the specific hardware described herein may be employed in methods implemented using other hardware.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples the functionality described herein may be operated under computer control, such as may be provided by a programmable processor or other such control logic. This may be achieved using a general purpose processor, which may be configured to perform a method according to any one of those described herein. In some examples such a controller may comprise digital logic, such as field programmable gate arrays, FPGA, application specific integrated circuits, ASIC, a digital signal processor, DSP, or by any other appropriate hardware. In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein. The controller may comprise an analogue control circuit which provides at least a part of this control functionality. An embodiment provides an analogue control circuit configured to perform any one or more of the methods described herein.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A smartcard circuit for control of a near field RF communications chip for a smartcard, the circuit comprising:
 a primary inductive coupler for connection to a near field antenna of a smart card for obtaining an RF electrical signal from the antenna;
 a secondary inductive coupler arranged for inductive coupling with the primary inductive coupler and connected to the chip for provision of the RF electrical signal from the primary inductive coupler to enable the chip to perform near field RF communications for the smartcard; and
 switching circuitry coupled to the secondary inductive coupler and comprising an RF conduction path selectively operable to disable said provision of the RF electrical signal thereby to inhibit the chip from performing near field RF communications
 wherein the RF conduction path is controlled by a transistor having a drain connected to one plate of at least one capacitor in the RF conduction path wherein a one-way conduction path is arranged so that transmission of RF signal along the RF conduction path causes accumulation of an electrical charge on the one plate of the at least one capacitor via the one-way conduction path.

2. The smartcard circuit of claim 1 in which the switching circuitry has a first state in which the RF electrical signal is provided to the near field RF communications chip and a second state in which the RF electrical signal is diverted away from the near field RF communications chip to inhibit the chip from performing near field RF communications.

3. A smartcard circuit for control of a near field RF communications chip for a smartcard, the circuit comprising:
 a splitter for connection to a near field antenna of a smart card for obtaining an RF electrical signal from the antenna and for splitting the RF electrical signal between an auxiliary circuit and the near field RF communications chip to enable the chip to perform near field RF communications for the smartcard; and
 switching circuitry coupled to the splitter and comprising a switchable element having a first state in which the RF electrical signal is provided from the splitter to the near field RF communications chip and a second state in which the RF electrical signal is diverted away from the near field RF communications chip to inhibit the chip from performing near field RF communications
 wherein the switchable element comprises an RF conduction path controlled by a transistor having a drain connected to one plate of at least one capacitor in the RF conduction path wherein a one-way conduction path is arranged so that transmission of RF signal along the RF conduction path causes accumulation of an electrical charge on the one plate of the at least one capacitor via the one-way conduction path.

4. The smart card circuit of claim 3 in which in the first state the RF electrical signal flows to the chip via a conductive link separate from the switchable element, and in the second state the RF electrical signal is diverted through the switchable element.

5. The smart card circuit of claim 4 in which the switching circuitry is one of (a) connected between RF connections of the near field RF communications chip and (b) connected to provide a selectively operable connection in series with an RF connection of the near field RF communications chip.

6. The smart card circuit of claim 5 in which the switching element is connected between:
 a first impedance matching network which connects the switching element for receiving the RF electrical signal and
 a second impedance matching network for connecting the switching element to the near field RF communications chip.

7. The smart card circuit of claim 3 wherein the splitter comprises:
 a primary inductive coupler for connection to the near field antenna for obtaining the RF electrical signal from the antenna; and
 a secondary inductive coupler arranged for inductive coupling with the primary inductive coupler and connected to the chip for provision of the RF electrical signal from the primary inductive coupler to enable the chip to perform near field RF communications for the smartcard.

8. The smart card circuit of claim 1 wherein the drain is connected in RF and isolated in DC by at least one capacitor, from at least one of a first main connection and a second main connection of the switching circuitry.

9. The smart card circuit of claim 8 wherein the at least one capacitor comprises two decoupling capacitors and said RF connection and DC isolation is provided by the decoupling capacitors being connected between the drain and respective ones of the first main connection and the second main connection.

10. A radio frequency, RF, switch for control of an electrical signal in a smartcard,
the RF switch comprising:
an RF conduction path for conducting RF electrical energy through the RF switch between a first main connection and a second main connection;
a reference path connected to the RF conduction path wherein the reference path comprises:
a switchable conduction path between the RF conduction path and a reference voltage connection; and
a one way conduction path, in parallel with the switchable conduction path between the RF conduction path and the reference voltage connection;
wherein the reference path is DC isolated from the first main connection and the second main connection so that, in operation, provision of an RF signal along the RF conduction path causes accumulation of an electrical charge on the RF conduction path via the one way conduction path.

11. The RF switch of claim 10 wherein the switchable conduction path is RF connected to and DC isolated from the first main connection and the second main connection by a first decoupling capacitor connected between the switchable conduction path and the first main connection and a second decoupling capacitor connected between the switchable conduction path and the second main connection.

12. The RF switch of claim 10 wherein the switchable conduction path is provided by a conduction channel of a transistor and the one-way conduction path is provided by a parasitic diode.

13. The RF switch of claim 12 wherein the transistor is a FET, such as a MOSFET, and the parasitic diode comprises a body diode.

14. The RF switch of claim 10 comprising a band-stop filter coupled between the RF conduction path and the reference voltage connection.

15. The RF switch of claim 14 in which the band-stop filter is one of (a) connected between the reference path and the reference connection; and (b) connected between the RF conduction path and the reference connection.

16. The RF switch of claim 10 wherein a component is connected between the reference path and the RF conduction path, and comprises at least one of (a) a chip; (b) a communication inhibiting circuit; and (c) a capacitor to provide said DC isolation of the reference path from the first main connection and the second main connection.

17. A radio frequency, RF, switch for control of an electrical signal in a smartcard, the RF switch comprising:
an RF conduction path for conducting RF electrical energy through the RF switch between a first main connection and a second main connection wherein the RF conduction path comprises:
a field effect transistor, FET, in which the conduction channel of the FET provides a switchable element of the RF conduction path, and
a decoupling capacitor which connects a drain of the FET to the first main connection wherein a body diode of the FET is connected to provide a one way conduction path in parallel with the conduction channel of the FET; and
the RF switch further comprises:
a ground path connected to a reference voltage and connected by the one-way conduction path and the conduction channel of the FET to the decoupling capacitor.

18. The RF switch of claim 17 wherein a controller is connected to a gate of the FET by a resistor, and the source the FET is connected to the reference voltage connection by a further resistor.

19. The RF switch of claim 18 wherein the controller provides a control voltage referenced to the reference voltage connection.

20. The radio frequency, RF, switch of claim 17 comprising a gate-source capacitor connected between a gate connection and a source connection of the FET wherein the gate-source capacitor has a capacitance selected to provide a gate-source short-circuit at an operating frequency of the switch thereby enabling a DC control voltage applied to the gate to operate the FET independent of the amplitude of signals on the RF conduction path at the operating frequency.

* * * * *